United States Patent [19]

Gross et al.

[11] 3,735,299

[45] May 22, 1973

[54] COLOR TELEVISION DEFLECTION YOKE HAVING REDUCED VARIATION IN BEAM TRIO DISTORTION

[75] Inventors: Josef Gross, Princeton; William Henry Barkow, Pennsauken, both of N.J.

[73] Assignee: RCA Corporation, New York, N.Y.

[22] Filed: Oct. 4, 1971

[21] Appl. No.: 186,168

[52] U.S. Cl. ..................................... 335/213, 313/77

[51] Int. Cl. ..................................... H01f 5/00

[58] Field of Search ..................................... 335/210, 213; 313/77; 315/24

[56] References Cited

UNITED STATES PATENTS

| | | | |
|---|---|---|---|
| 3,643,192 | 2/1972 | Chiodi | 335/213 |
| 3,631,533 | 12/1971 | Torsch | 335/213 |

*Primary Examiner*—George Harris
*Attorney*—Eugene M. Whitacre

[57] ABSTRACT

A deflection yoke for a color television receiver utilizing a delta gun shadow mask color picture tube has its winding distribution selected for minimizing the variations of the beam trio distortion around the picture tube display face for permitting use of a shadow mask yielding a greater and more uniform brightness over the viewed area of the tube.

6 Claims, 9 Drawing Figures

INVENTORS
Josef Gross &
William H. Barkow
BY [signature]
ATTORNEY

INVENTORS
*Josef Gross &*
*William H. Barkow*
BY [signature]
ATTORNEY

COLOR TELEVISION DEFLECTION YOKE HAVING REDUCED VARIATION IN BEAM TRIO DISTORTION

BACKGROUND OF THE INVENTION

This invention relates to deflection yokes for color television picture tubes and particularly to yokes for substantially equalizing the normalized beam trio distortion ratios observed on the face of the picture tube.

Current color television receivers commonly utilize a picture tube of the delta gun shadow mask type in which three electron beams are generated by three electron guns disposed at the apices of an equilateral triangle. The three beams pass through apertures of the shadow mask to land on and excite different colored phosphor dots disposed in generally equilateral triangular groups on a display screen.

Ideally, the mask so shadows the screen that each of the different color representative beams passes through the apertures to land only on its respective color phosphor dots as the beams are caused to scan a raster over the display face. However, in practice the picture tube geometry and the effects of converging the electron beams result in undesirable beam trio distortion which varies at different points in the raster and which leads to reduction in picture tube light output at the edges of the raster relative to the light output at the center. This problem is even more noticeable in receivers utilizing wide angle picture tubes such as those in which the beams are deflected over an angle of 110 degrees.

Ideally, electrons of the three color representative electron beams from the equilateral electron gun assembly pass through the shadow mask apertures and excite flourescent spots on the phosphor screen which form equilateral triangles thereon. This situation is prevented by beam landing errors caused by deflection and convergence action or by tube geometry. Tube geometry produces a landing error called "crowding" which is the result of the beams passing through off center apertures and landing on the nonplanar surface of the viewing screen. The effect is a foreshortening distortion of the equilateral beam landing pattern in a radial direction. "Degrouping" is a landing error caused by the transverse motion of the virtual sources of the beams under deflection and dynamic convergence, and would affect the beams in passing through the apertures of a hypothetical planar mask-screen system. A hypothetical yoke with zero isotropic and anisotropic astigmatism, utilized to scan three beams that are dynamically converged using equal radial motions for the three beams at every point in the raster, will not cause any distortion of the beam trio landing pattern in addition to that caused by crowding. A yoke with astigmatism will add distortions to the beam landing pattern caused by crowding.

The term "astigmatism" as used herein refers to an aberration of the unconverged electron beams imparted to it by the astigmatic characteristics of the deflection yoke, and is independent of the mask-screen geometry.

In any modern delta gun shadow mask color picture tube crowding and degrouping act simultaneously to produce the observed beam landing pattern.

The term "beam trio distortion ratio" as used herein is defined as the ratio of one of the pair of substantially similar legs of the triangle of fluorescent spots to the third leg or vice versa. The terms of the ratio are always selected to be greater than unity in all cases to facilitate the distortion ratio comparison between triangles at any place on the display face. In the usual situation in which the two similar legs are of slightly different length, the one is picked which will give the largest or worst case beam trio distortion ratio. While beam trio distortion ratios may be measured over most of the viewed area of the kinescope, it is to be understood that as referred to herein, the ratios are those observed around the peripheral region of the viewed area, for example, within approximately one quarter inch along the top, bottom and side edges as the distortion is generally greater in this area relative to the central viewed area. The beam landing patterns are readily observed on the display face of the kinescope with the aid of a magnifying lens.

The beam trio distortion ratio varies at different points in the scanned raster. As the distortion increases the apertures in the shadow mask must be reduced in size to insure that a beam passing therethrough will only strike the intended phosphor dot in the scanned raster. Since the beam distortion is greater near the edges of the screen it has been the practice to make the apertures in the center of the shadow mask larger than those at the edges. The size of the apertures at the edges is determined by the beam trio distortion ratio and the size of the apertures around the periphery of the shadow mask may be varied to correspond to the beam trio distortion ratio. If the aperture sizes vary too much, the variation in light output around the periphery of the picture tube becomes objectionable. As a design alternative the apertures around the periphery of the mask may all be made the same size as determined by the worst case of beam trio distortion. Although this equalizes the light output around the periphery of the raster, the smaller edge apertures undesirably result in less light output of the picture tube near the edges because of the smaller beam portions which excite the phosphor dots in these areas. To avoid excessive variation in light output over the screen the center apertures may also be reduced with the resulting overall loss of light output.

Distortion of the beam landing pattern becomes greater as the beam deflection angle is increased. The increased distortion ratios present in color television picture tubes utilizing 110° deflection angles require further correction than was needed in earlier smaller deflection angle systems in order to provide satisfactory performance with regard to color purity.

One form of prior art 110° deflection yoke described in U.S. Pat. No. 3,440,483 issued to J. Kaashoek et al. uses saddle type deflection coils which have minimum isotropic astigmatism resulting in minimum beam trio distortion along the vertical and horizontal deflection axes, but which then have anisotropic astigmatism resulting in beam trio distortion off-axis or in the corners of the raster. The anisotropic astigmatism in the corners is eliminated by utilizing dynamic yoke corner convergence correction apparatus in addition to utilizing the on-axis dynamic convergence correction apparatus common in the prior art. The resulting television picture is satisfactory but the additional correction circuitry is expensive and adds to the complexity of initial setting up and subsequent service of the receiver. The beam trio distortion ratio at the corners is still usually worse than on the two axes.

A toroidal deflection yoke suitable for use in a 110° deflection system which does away with the need for dynamic yoke corner convergence correction apparatus such as required by Kaashoek et al. is disclosed in application Ser. No. 42,927, now U.S. Pat. No. 3,643,192, filed for Wayne R. Chiodi and entitled TOROIDAL ELECTROMAGNETIC DEFLECTION YOKE. This yoke has its winding distribution selected for producing minimum anisotropic astigmatism resulting in minimum misconvergence of the beams in the corners of the raster. The yoke also exhibits isotropic astigmatism resulting in nonuniform misconvergence in the direction of the deflection axes. This on-axis misconvergence may readily be substantially eliminated by utilizing conventional on-axis dynamic convergence correction apparatus which utilizes waveforms at the line and field scanning rates to energize electromagnets disposed around the neck of the kinescope to converge the beams radially. Thus, this arrangement provides a more economical alternative to achieving convergence than the dynamic yoke corner convergence correction approach described above. However, such a toroidal yoke having minimum anisotropic astigmatism and yielding minimum misconvergence may also cause a substantial variation of beam trio distortion around the edge of a color picture tube, necessitating the use of a shadow mask which has smaller peripheral apertures as described above and yields lower light output around the edges of the picture tube viewing screen.

In accordance with the invention a deflection yoke for a delta gun shadow mask color television picture tube is provided having a coil winding distribution selected such that there is substantially equal beam trio distortion ratio observed around the edge region of the scanned raster.

In one embodiment of the invention the coil winding distribution is selected such that the yoke produces substantially no yoke-induced beam trio distortion in the corners of a generally rectangular scanned raster, thereby eliminating the need for dynamic yoke corner convergence correction apparatus, and the coil winding distribution is further selected for minimizing the beam trio distortion ratio observed around the edge region of the scanned raster.

In another embodiment of the invention the yoke winding conductor distribution is selected for producing some yoke-induced beam trio distortion in the corners of a generally rectangular scanned raster. The winding is then further selected for producing substantially equal beam trio distortion ratios observed around the edge region of the scanned raster. In this embodiment dynamic corner convergence waveforms would be utilized with the beam convergence apparatus, but the advantage would be in a relatively small variation in beam trio distortion ratio observed around the edge region of the scanned raster.

A more detailed description of the invention is given in the specification and accompanying drawings of which:

Figure 6A:
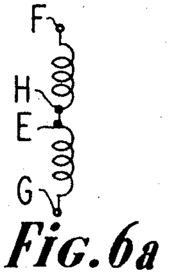
Figure 6B:
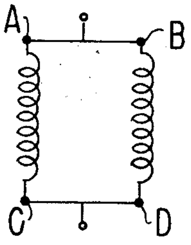
Figure 5:
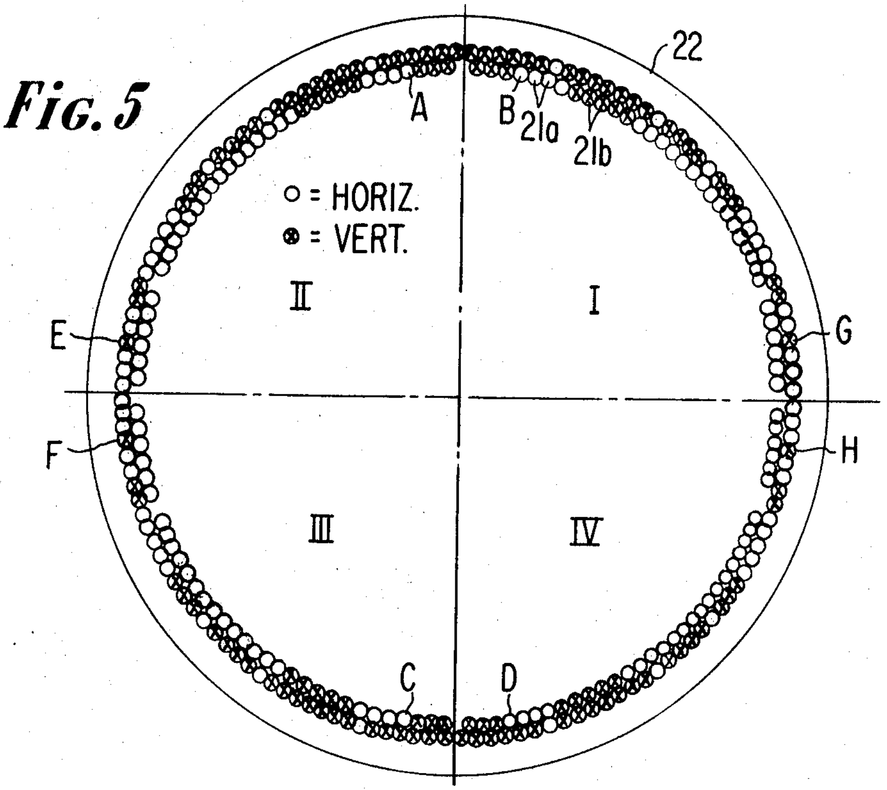
FIG. 5 is a partial cross sectional view illustrating the winding distribution of a toroidal deflection yoke according to the invention.
Figure 4:
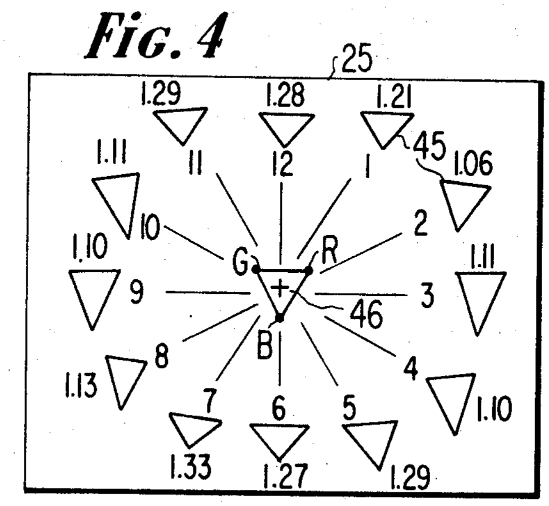
FIG. 4 illustrates beam trio distortion produced by prior art deflection yokes as observed on the display face of a color television picture tube.
Figure 7:
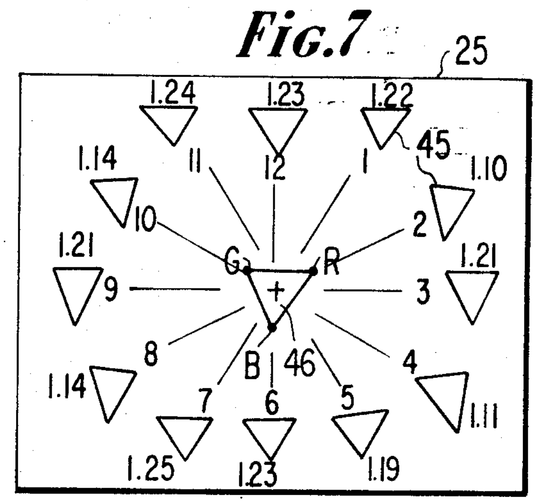
Figure 8:
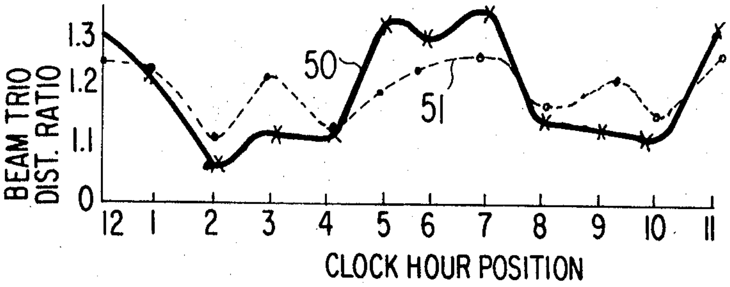

FIGS. 6*a* and 6*b* are schematic representations of the vertical and horizontal coil winding portions of the yoke illustrated in FIG. 5;

FIG. 7 illustrates beam trio distortion produced by a deflection yoke according to the invention as observed on the display face of a color television picture tube; and FIG. 8 is a graph showing the comparison of the beam trio distortions shown in FIGS. 4 and 7.

DESCRIPTION OF THE INVENTION

Figure 1:
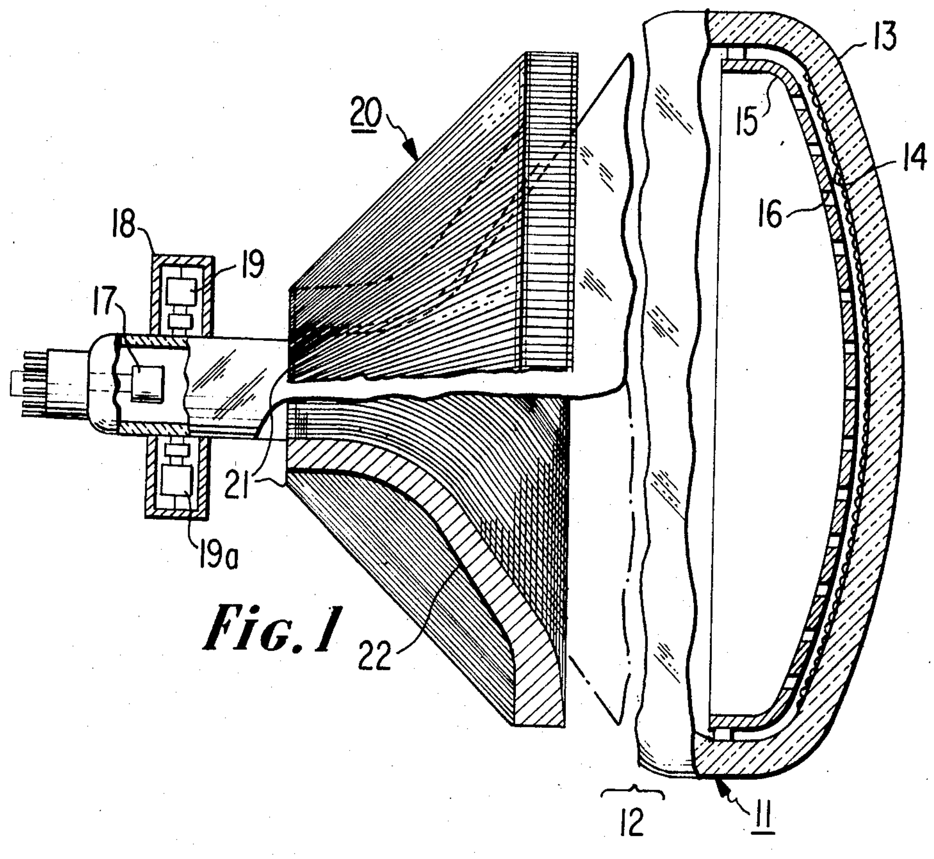
FIG. 1 is a partial sectional view of a color picture tube and associated deflection and convergence apparatus including a deflection yoke according to the invention.

FIG. 1 is a partial sectional view of a color picture tube and associated deflection and convergence apparatus including a deflection yoke according to the invention. A delta gun shadow mask color television picture tube 12 comprises an evacuated glass envelope 11. At one end of envelope 11 is a faceplate 13 on the inside of which is disposed a relatively large number of phosphor dots 14. Phosphor dots 14 comprise adjacent trios of red, green and blue phosphorescent material which emit their respective colored lights when bombarded by electron beams. On the inside of envelope 11 disposed a short distance from the phosphor dots 14 is an aperture mask 15, commonly called a "shadow mask", having a plurality of apertures 16. The phosphor dots 14 are disposed in a predetermined relationship to the apertures 16.

At the other end of picture tube 12 is an electron gun structure 17 comprising three electron guns for producing three simultaneous electron beams representative of the red, blue and green image content of a televised scene. The three electron guns are disposed at the apices of an equilateral triangle with two guns being in a horizontal plane and the third gun in a vertical plane midway between the two first mentioned electron guns. Picture tube 12 is of the type having a deflection angle of 110° i.e., the three electron beams emitted from electron gun structure 17 are deflected over an angle of 110° on the faceplate 13.

Disposed concentrically around the outside of picture tube 12 and following the contour of the glass envelope 11 is a deflection yoke 20. This yoke is illustrated as a toroidal deflection yoke having a number of turns of conductors 21 wound in toroidal fashion about a ferrite core 22. The conductors 21 are disposed to form horizontal and vertical coil winding portions which when suitably energized by conventional scanning currents at the television line and field scanning rates supplied by conventional apparatus, not shown, deflect the electron beams vertically and horizontally over the faceplate 13. The winding distribution of yoke 20 is selected such that it produces substantially no anisotropic astigmatism of the beams but does produce some isotropic astigmatism. Yoke 20 will be described subsequently in greater detail.

Disposed circumferentially around the outside of the neck portion of picture tube 12 in the region just forward of the electron gun structure 17 is an electromagnetic dynamic convergence assembly 18. Convergence assembly 18 is of a conventional type including three electromagnets 19 disposed adjacent each of the electron guns of electron gun structure 17 to effect radial movement of the beams when suitable dynamic convergence correction waveforms at the line and field scanning rates are coupled to each of the electromagnets. In FIG. 1 only two of the electromagnets 19 and 19*a* are illustrated. The convergence correction waveforms coupled to the electromagnets are obtained from conventional convergence waveform circuitry, not shown, which supplies suitable waveforms at the line and field scanning rates to respective vertical and horizontal coil portions of each of the electromagnets. This type apparatus provides on-axis radial dynamic convergence correction. Because of the characteristics of the yoke resulting in substantially no anisotropic astigmatism, no dynamic corner convergence correction waveforms and associated circuitry are required. A yoke exhibiting these characteristics may be one of the type disclosed in the above-mentioned Chiodi application or in application Ser. No. 95,847, now U.S. Pat. No. 3,668,580, TOROIDAL DEFLECTION YOKE HAVING ASYMMETRICAL WINDINGS filed by Robert L. Barbin.

Figure 2:
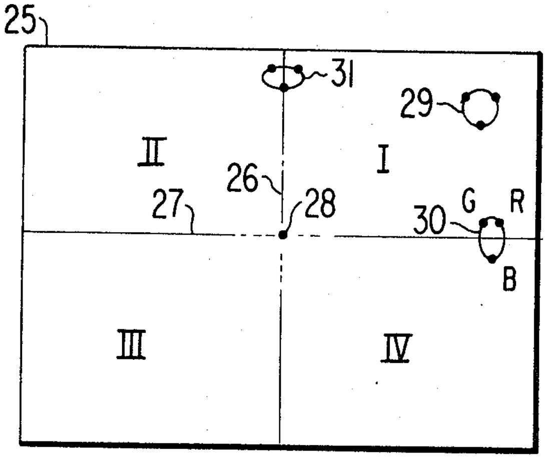
FIG. 2 illustrates certain characteristics of the deflection yoke of FIG. 1 as observed on the display face of a color television picture tube.

FIG. 2 illustrates certain characteristics of the deflection yoke 20 of FIG. 1 as observed on the display face of a color television picture tube. A display face 25 is divided into quadrants I, II, III and IV by vertical and horizontal axes 26 and 27 respectively. Illustrated by unconverged beam groups 29, 30 and 31 are typical unconverged patterns of the beams in respective portions of quadrant I which illustrate the characteristics of the deflection yoke. These unconverged patterns are obtained by utilizing a deflection yoke 20 having the astigmatism characteristics described above.

In general, beam trio group 28 observed in the center of the display face would be converged to form a point were it not for the almost always presence beam alignment errors due to electron gun geometry. Suitable adjustment of conventional magnets on the neck of the picture tube help to converge the beams at the center of the screen.

As previously mentioned and as is known in the art the deflection yoke may be selected to have substantially no anisotropic astigmatism, i. e., the unconverged beams in the corners of the scanned raster form an equilateral triangle which may be circumscribed by a circle. However, although there is no astigmatism exhibited by the three beams in the corners, the landing pattern in the corners observed on the display screen will exhibit some triangular distortion due to the crowding effects of the picture tube geometry as previously described. The situation in which the beams exhibit substantially zero corner astigmatism caused by the yoke is illustrated by the beam trio group 29 in quadrant I. At the same time the yoke winding distribution is selected such that the yoke exhibits isotropic or on-axis astigmatism. Isotropic astigmatism results in an unconverged beam group pattern which is distorted along the deflection axes. Thus, beam group 31 on the vertical axis 26 illustrates the effect of negative vertical isotropic astigmatism under which conditions the blue beam is pushed up to the red and green beams such that the equilateral triangular pattern of unconverged beams no longer exists and the resulting triangular pattern must be circumscribed by an ellipse. Beam group 30 on the horizontal axis 27 illustrates the effects of negative horizontal isotropic astigmatism which has the effect of pushing the red and green beams inwardly towards the blue. This pattern of unconverged beams similarly is not equilaterally triangular and is circumscribed by an ellipse. The unconverged beam patterns in corresponding portions of quadrants I, III and IV are generally similar to those described for quadrant I.

The unconverged beam characteristics described above are desirable for convergence purposes in that no dynamic corner correction convergence apparatus is required as the characteristics of this yoke ensure substantial convergence of the beams in the corners. The resulting misconvergence of the beams along the deflection axes may be corrected by utilizing a conventional on-axis dynamic convergence correction scheme as described above. The yoke described thus far is satisfactory in many respects but it also has the undesirable characteristic which causes beam degrouping or beam trio distortion to vary at different points around the perimeter of the scanned raster. As previously mentioned, this varying amount of distortion would ordinarily result in the apertures of the shadow mask being made smaller around the edges to compensate for the worst beam trio distortion ratio with a consequent reduction of picture tube light output around the edges of the tube.

Figure 3:
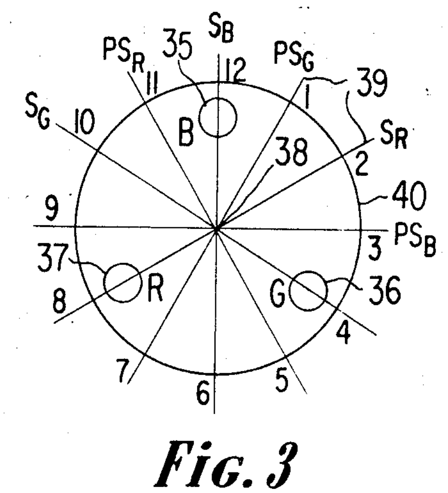
FIG. 3 illustrates various axes of a delta gun shadow mask color television picture tube in relation to the electron guns.

FIG. 3 illustrates various axes in relation to the electron guns of a delta gun shadow mask color television picture tube such as shown in FIG. 1. The blue, green and red electron guns respectively labeled 35, 36 and 37 of an electron gun assembly are disposed about a central axis 38. The three guns form an equilateral triangle about central axis 38. A plurality of axes 39 are drawn through the central axis 38. Two axes 39 are drawn in relation to each of the electron guns. For example, an axis $S_B$ is shown extending through the blue electron gun 35 and through the central axis 38. Another axis labeled $PS_B$ is shown at right angles to the $S_B$ axis. Similarly, two axes are shown for each of the red and green electron guns 36 and 37 respectively. It should be noted that each axis 39 is rotated 30° with respect to any adjacent axis 39. Thus the axes 39 intersect a circle 40 disposed around the electron guns at twelve points which correspond to the hour numerals of a clock. Each axis 39 has associated with it a number from 1 to 12 corresponding to the hours of a clock. For example, the $S_B$ axis is in the 12–6 o'clock position and the $PS_B$ axis is in the 3–9 o'clock position.

Within the picture tube 12 of FIG. 1 the three electron guns are disposed around the central longitudinal axis of the picture tube, which axis intersects the middle of the display face. Thus, the axes 39 extending through the hours of a clock also extend in like manner through the hours of an imaginary clock face on the display face of the picture tube.

It has been determined that, due to the geometry of the apertures in the shadow mask in relation to the phosphor dot trios on the display face, the shadow mask apertures must be reduced more for a given beam trio distortion ratio along the PS or odd-numbered clock hours than on the S axis or even-numbered clock hour positions. Particularly, in the case of a 110° deflection angle picture tube, a variation of 0.1 from a nominal beam trio distortion ratio of 1 causes approximately a 17 percent decrease in light output at the edges of the display screen along the odd-numbered positions whereas the same bean distortion causes approximately only a 12 percent light output decrease at the even-numbered positions. The worse case distortion ratio determines the maximum size aperture of the shadow mask in the edge regions. Thus it can be said that the light output of the picture tube is more sensitive to beam trio distortion at the odd clock positions than it is at the even clock positions and the light output of the picture tube will be limited by the worst beam trio distortion ratio. A feature of the invention is to provide a deflection yoke having its deflection winding distribution selected for minimizing the variations of the beam trio distortion ratios on the PS axes and to weight the ratios between the PS and S axes to correct for the light output sensitivity difference between these axes. The practical result of this is to enable utilization of a shadow mask with larger than normal apertures around the edges of the mask, with a consequent increase in light output around the edges of the picture tube and more uniform light output all over the picture tube display face.

FIG. 4 illustrates beam trio distortion produced by prior art yokes of the kind exhibiting substantially no anisotropic astigmatism but some isotropic astigmatism. The distortion is seen in the form of non-equilateral triangles disposed around a display face 25 at various labeled clock hour numeral positions of a 110° deflection angle color kinescope. The apices of each triangle 45 represent the points at which the converged red, blue and green beams of an electron beam trio land on the respectively colored phosphor dots of the display face. The particular apices of each triangle at which the respective colored beams land is indicated at the central triangle 45 on the display face 25. It is to be understood that the beam landings are at the corresponding apices of all of the other triangles 45.

The central triangle is disposed around a central axis 46 of the display face. This triangle is equilateral except for the effects of beam alignment as described above. Triangles are not shown in the four corners of the display face 25 but it is to be understood that they would exhibit beam trio distortion due to crowding which would be approximately half way between the crowding distortion component of the trios on adjacent clock hour positions.

At the 3–9 o'clock axis it can be seen that the triangles are not equilateral and that the green and red beams are compressed towards each other. The amount by which the beam trio is distorted is indicated by the numbers adjacent each triangle. These numbers represent the beam trio distortion ratio, which is the ratio of one of the two legs of the distorted triangle of fluorescent spots, which are of similar length, to the third leg. It can be seen that the largest trio distortion ratio on the odd-numbered clock positions is 1.33. The ratio indicating the largest deviation from unity on the even-numbered clock positions is 1.28, occurring at 12 o'clock. Thus it can be seen that the worst case or limiting ratio is 1.33 which occurs at 7 o'clock.

FIG. 5 illustrates the winding distribution of a toroidal deflection yoke according to the invention. The illustrated deflection yoke comprises a ferrite core 22 having wound about it in a toroidal fashion a plurality of horizontal conductors 21*a* and a plurality of vertical conductors 21*b*. Although not shown, it is to be understood that the return conductors are disposed around the outside of ferrite core 22.

The conductors form two interleaved layers with the innermost layer being interleaved between the conductors of the outside layer. As previously mentioned the starting point for winding a yoke according to the invention is to select a yoke design for minimum misconvergence such as described in the aforementioned Chiodi or Barbin application. These yokes are designed for having substantially no anisotropic astigmatism in the corners but some isotropic astigmatism along the respective horizontal and vertical deflection axes. The yoke illustrated in FIG. 5 is a symmetrically wound yoke in which the conductor distribution is the same in each of quadrants I, II, III and IV. This yoke may exhibit characteristics which produce a varying beam distortion ratio around the clock hour positions as illustrated in FIG. 4. Particularly noticeable is the relatively large beam trio distortion ratio variation around the clock at the odd-numbered hour positions. According to the invention it has been discovered that the winding distribution may be selected for minimizing the variation of the beam trio distortion ratios at the various clock hour positions. A particular winding distribution shown in FIG. 5 includes the winding distribution modification for minimizing the beam trio distortion ratios. The effects of this modified winding distribution will be described subsequently in conjunction with FIG. 7. In general, the winding distribution must be modified empirically for a given picture tube type. A satisfactory winding distribution is determined by achieving satisfactory beam trio landing patterns as observed on the viewing screen of the picture tube.

There are particular restrictions which must be adhered to in selecting the modified winding distribution according to the invention. The pattern of unconverged beams in the corners of the picture tube should be substantially free of anisotropic astigmatism as possible to eliminate the need for dynamic corner convergence correction apparatus. Further, in order to minimize the beam trio distortion variations around the various clock positions it should be noted that the winding distribution can be selected such that the relative distortion along the vertical and horizontal axis may be balanced. For example, it has been determined that the beam trio distortion ratio along the 12–6 o'clock axis of FIG. 4 may be changed with a complementary change in beam trio distortion ratios on the 3–9 o'clock axis. Even with the winding distribution modified by suitable interleaving of the conductors for achieving this result the beam trio patterns in the corners may still be maintained approximately at unity. At the same time the beam trio distortion ratios at the odd-numbered clock hour positions are observed and the desired winding distribution is selected for minimum variation of beam trio distortion ratios at these positions. The winding distribution is selected for achieving a suitable balance between the astigmatism of the vertical and horizontal coils which results in minimum beam trio distortion ratio variations. The lettered conductors A, B, C, etc. of FIG. 5 represent the taps of conductor portions which form the respective horizontal and vertical coil winding portions.

FIG. 6A and 6B are schematic representations of the vertical and horizontal coil winding portions of the yoke shown in FIG. 5. FIG. 6A shows the series connected vertical coil winding portions comprising a first portion F–H serially connected with a second portion E–G. FIG. 6B illustrates the parallel connection of the two horizontal coil winding portions A–C in parallel with B–D. The parallel connection of the horizontal coil portions may be desirable for forming a low impedance horizontal coil winding suitable for being energized by a semiconductor horizontal driving stage. It should be noted that the coil sections may be serially connected for forming a higher impedance unit suitable for being driven by drive circuits utilizing vacuum tubes. The series connection of the horizontal coils comprises section A–C serially connected with section B–D.

FIG. 7 illustrates beam trio distortion produced by a deflection yoke according to the invention as observed on the display face of a color television picture tube. FIG. 7 is similar to FIG. 4 in that a plurality of triangles 45 disposed at numbered clock hour positions on a display face 25 represent the deviations of the beam from a perfect landing pattern forming equilateral triangles. The normalized beam trio distortion ratios are given adjacent each triangle. It should be noted in FIG. 7 that the triangles 45 at the odd-numbered clock positions exhibit beam distortion ratios which are substantially equal and which have a lesser magnitude than the beam trio distortion ratios given in FIG. 4. The beam trio distortion ratio along the 3–9 o'clock axis is greater than along the corresponding axis in FIG. 4 but it is also substantially equal to the distortion ratios at the other odd-numbered clock hour positions. It is to be understood that the beam trio distortion ratio in the corners of FIG. 7 which would correspond to the 1:30, 4:30, 7:30 and 10:30 positions exhibit no yoke induced distortion but only the distortion caused by crowding. With the beam trio distortion ratios being substantially equal around the perimeter of the display face and being of a lesser magnitude than those produced by prior art yokes, a color picture tube having larger beam landing areas around the edges of the tube may be utilized, resulting in a brighter and more uniformly illuminated television picture.

FIG. 8 is a graph showing the comparison of the beam trio distortions illustrated in FIGS. 4 and 7. In the graph the clock hour positions are plotted along the abscissa and the beam trio distortion ratios are plotted along the ordinate. A first curve 50 represented by a solid line is a plot of the beam trio distortion ratio of the prior art yokes. The dashed line 51 represents the beam trio distortion ratio of a yoke which has its winding distribution selected in accordance with the invention. It can be seen clearly that the response of the yoke according to the invention and represented by the curve 51 is more uniform than the curve representing the beam trio distortion ratio of prior art yokes. Also, the limiting distortion ratio, or the largest ratio, is substantially smaller than that of the prior art yoke and the range of beam trio distortion ratios is substantially smaller.

In the embodiment described above the invention was applied to enable the use of a static yoke requiring neither a difference current drive to the yoke as disclosed in the Kaashoek et al. patent or dynamic corner correction waveforms applied to a convergence assembly.

In another embodiment of the invention a yoke may be designed to have less astigmatism at points around the raster at the expense of exhibiting some astigmatism in the corners. In this situation dynamic corner convergence correction waveforms would be applied to the convergence electromagnets to properly converge the beams in the corners, these waveforms comprising a waveform at the vertical scanning rate modulated at the horizontal scanning rate and vice versa, as is known in the art. However, the principles of the invention can be applied to balance the astigmatism between the horizontal and vertical coil winding portions such that the variations in beam trio distortion ratios observed around the edge region of the raster are relatively small. As in the first described embodiment, the desired winding distribution is determined empirically by observing the beam trio distortion ratios as the distribution is altered by the interleaving and spacing of the vertical and horizontal coil winding conductors.

What is claimed is:

1. A yoke for deflecting the beams of a delta gun shadow mask color kinescope with minimum beam landing pattern distortion variation as measured at points on the raster around the edges of a generally rectangular scanned area of the kinescope, comprising:

a yoke including vertical and horizontal deflection coil winding portions adapted to be energized by suitable currents for deflecting said beams vertically and horizontally, the conductor distribution of said coil winding portions being selected for producing a magnetic deflection field for effecting deflection of said beams such that there is substantially zero yoke-induced beam trio distortion in the corners of said scanned area, the conductor distribution being further selected for producing said field for effecting deflection of said beams in all portions around the edge region of said scanned area except in said corner regions such that there is substantially equal beam trio distortion ratios observed around the entire edge region of said raster.

2. A toroidal deflection yoke for a delta gun shadow mask color kinescope, comprising:

a generally cylindrical core having a portion thereof flared to conform substantially with a flared portion of said kinescope; and conductors wound in toroidal fashion on said core for forming vertical and horizontal coil portions which when suitably energized by scanning current deflect the three beams of said kinescope in vertical and horizontal directions for forming a scanned raster on the display face of said kinescope, the distribution of conductors in said coil portions being selected for producing a magnetic deflection field which produces some isotropic astigmatism but substantially no anisotropic astigmatism such that the beam landing pattern observed in the corners of said display face of said kinescope, exhibits no yoke induced beam trio distortion, said distribution being further selected for balancing and isotropic astigmatism between said vertical and horizontal coil portions while maintaining said anisotropic astigmatism at substantially zero for substantially equalizing the beam trio distortion ratio of the beam landing pattern observed around the edge region of said scanned raster.

3. A toroidal deflection yoke for deflecting an electron beam trio in a delta gun shadow mask color kinescope, comprising:

a generally cylindrical flared core member substantially conforming to a portion of the outside contour of said kinescope; and horizontal and vertical coil winding portions toroidally wound around said core for producing when energized by suitable scanning currents a magnetic field for deflecting said beam trio emitted from said delta gun as three beams respectively located at the apices of an equilateral triangle horizontally and vertically over the display face of said kinescope for forming a raster thereon;

said coil winding portions being selected for producing said deflection field which imparts some isotropic astigmatism and substantially no anisotropic astigmatism to said beam trio such that no yoke-induced beam trio distortion is observed in the corners of said raster, said coil winding portions being further selected for producing said deflection field for substantially equalizing the beam trio distortion ratios observed in the edge region of said raster for minimizing the light output variations at different portions of the scanned portion of said kinescope display face.

4. In a color television receiver, including the combination of a beam deflection system, a beam convergence system and a delta gun shadow mask kinescope including an electron gun structure for emitting electron beams from each of three electron guns disposed at the apices of an equilateral triangle, a display screen comprising trios of red, green and blue phosphor dots, and an aperture mask in registry with said display screen for permitting said three electron beams to pass therethrough to land on respective ones of said phosphor dots, and wherein beam trio distortion ratios of the beam landing pattern observed on the generally rectangular raster scanned by said beams on said display face are caused by a combination of beam crowding due to aperture mask and phosphor dot placement and degrouping due to the convergence and deflection component, a toroidal deflection yoke comprising:

a toroidal yoke core;

conductors wound around said core for forming vertical and horizontal coil winding portions disposed around said kinescope between said electron gun assembly and said aperture mask for deflecting said beams horizontally and vertically to scan said raster on said display screen, the distribution of conductors comprising said vertical and horizontal coil winding portions being selected for effecting deflection of said beams in the corners of said raster with substantially no yoke-induced beam trio distortion ratio component, said conductor distribution being further selected for effecting deflection of said beams in all portions around the edge region of said raster except said corners with substantially equal beam trio distortion ratios such that the beam trio landing pattern observed around the edge portion of said raster including said corners exhibits substantially equal beam trio distortion ratios resulting in substantially equal light output around the entire edge region of said raster.

5. A toroidal deflection yoke for use with a shadow mask color television picture tube in which three electron beams are emitted from an electron gun structure including three electron guns disposed in an equilateral triangular pattern, comprising:

a ferrite core;

conductors toroidally wound around said core for forming horizontal and vertical coil winding portions for deflecting said electron beams to scan a raster on the display face of said picture tube when suitably energized by canning currents, the conductor distribution of said coils being selected for producing isotropic astigmatism such that on-axis dynamic convergence correction is required for converging said beams in vertical and horizontal directions;

the conductor distribution being further selected for producing substantially no anisotropic astigmatism such that no dynamic corner convergence correction is required for converging said beams in the corners of said raster, and the conductor distribution being further selected for apportioning said isotropic astigmatism between said vertical and horizontal coil winding portions for producing substantially no variation in beam trio landing pattern distortion ratios around the edge region of said raster.

6. A yoke for deflecting the beams of a delta gun shadow mask color kinescope with minimum beam landing pattern distortion variation as measured at points on the raster around the edges of a generally rectangular scanned area of the kinescope, comprising:

a yoke including vertical and horizontal deflection coil winding portions adapted to be energized by suitable currents for deflecting said beams vertically and horizontally, the conductor distribution of said coil winding portions being selected for producing a magnetic deflection field for effecting deflection of said beams such that there is some yoke-induced beam trio distortion in the corners of said scanned area and some yoke-induced beam trio distortion at other points in said scanned raster, the conductor distribution being further selected for effecting deflection of said beams such that there is substantially equal beam trio distortion ratio observed around the edge region of said scanned area.

* * * * *